(12) United States Patent
Kwon et al.

(10) Patent No.: US 10,243,223 B2
(45) Date of Patent: Mar. 26, 2019

(54) FUEL CELL STACK

(71) Applicant: Hyundai Motor Company, Seoul (KR)

(72) Inventors: Hyuck Roul Kwon, Gyeonggi-do (KR); Hyunyoo Kim, Seoul (KR); JuHan Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 277 days.

(21) Appl. No.: 15/186,789

(22) Filed: Jun. 20, 2016

(65) Prior Publication Data

US 2017/0084933 A1    Mar. 23, 2017

(30) Foreign Application Priority Data

Sep. 23, 2015    (KR) .................. 10-2015-0134956

(51) Int. Cl.
| | | |
|---|---|---|
| *H01M 8/04* | (2016.01) | |
| *H01M 8/04014* | (2016.01) | |
| *H01M 8/04029* | (2016.01) | |
| *H01M 8/24* | (2016.01) | |
| *H01M 8/241* | (2016.01) | |
| *H01M 8/2465* | (2016.01) | |
| *H01M 8/2483* | (2016.01) | |
| *H01M 8/04007* | (2016.01) | |

(52) U.S. Cl.
CPC ... *H01M 8/04067* (2013.01); *H01M 8/04014* (2013.01); *H01M 8/04029* (2013.01); *H01M 8/241* (2013.01); *H01M 8/2465* (2013.01); *H01M 8/2483* (2016.02); *H01M 2250/20* (2013.01); *Y02T 90/32* (2013.01)

(58) Field of Classification Search
None
See application file for complete search history.

(56) References Cited

U.S. PATENT DOCUMENTS

2012/0088175 A1    4/2012  Oriol

FOREIGN PATENT DOCUMENTS

| JP | 2008-269878 A | 11/2008 |
|---|---|---|
| JP | 2009-170112 A | 7/2009 |
| JP | 2012-526366 A | 10/2012 |
| JP | 2015-111545 A | 6/2015 |
| JP | 2015111545 A * | 6/2015 |
| KR | 10-2011-0123561 A | 11/2011 |
| KR | 2014-0024776 A | 3/2014 |
| KR | 2014-0086150 A | 7/2014 |

* cited by examiner

*Primary Examiner* — Daniel S Gatewood
(74) *Attorney, Agent, or Firm* — Mintz Levin Cohn Ferris Glovsky and Popeo, P.C.; Peter F. Corless

(57) ABSTRACT

A fuel cell stack is provided and includes a plurality of unit cells in which manifolds are provided and an end structural body that includes a current collector and an end plate. The end structural body is disposed at each of outermost sides of the unit cells. Additionally, a heat transfer member is disposed between the end structural body and the outermost side of the unit cell and contacts the outermost side of the unit cell in a planar direction.

18 Claims, 15 Drawing Sheets

FUEL CELL STACK

CROSS-REFERENCE TO RELATED APPLICATION

This application claims priority to and the benefit of Korean Patent Application No. 10-2015-0134956 filed in the Korean Intellectual Property Office on Sep. 23, 2015, the entire contents of which are incorporated herein by reference.

BACKGROUND (a) Field of the Invention

The present invention relates to a fuel cell stack, and more particularly, to a fuel cell stack in which that temperature deviation between cells is reduced.

(b) Description of the Related Art

A fuel cell stack is an electric power generating device that generates electrical energy through an electrochemical reaction between hydrogen and oxygen in respective fuel cells thereof, and is applied to a fuel cell vehicle, etc. Further, the fuel cell stack is a fuel cell assembly in which fuel cells are arranged sequentially. The fuel cell is a unit cell in which a separator is respectively disposed at opposite sides of a membrane-electrode assembly (MEA) with the MEA disposed therebetween. The fuel cells may be fastened with end plates and fastening members in a pressed state.

As mentioned, the fuel cell stack as described above generates electrical energy through an electrochemical reaction of hydrogen and oxygen, produces heat and water which are by-products of the electrochemical reaction, and is cooled by a coolant which is a cooling medium. In the fuel cell stack, a temperature distribution of the fuel cells should be uniformly maintained within a predetermined range. An end plate provided with a current collector is positioned at each of the opposite ends of the fuel cell stack, and a temperature of a cell (hereinafter, referred to as an "end cell") in the vicinity of the end plate is less than that of other cells.

A temperature deviation between the cells of the fuel cell stack occurs mainly during the cold-starting or the cold-driving of the fuel cell stack, and is caused due to the heat generated in the end cell being absorbed by components (e.g., the end plate and the current collector) having a substantially large heat capacity around the end cell and thus, a temperature rise of the end cell is delayed. Due to a low temperature of the end cell, reaction gas may be excessively humidified to cause flooding at the end cell. Accordingly, the reaction gas is supplied insufficiently at the end cell for a voltage of the cell to decrease, thus an output of the fuel cell stack may be limited. In order to improve the temperature deviation between the cells of the fuel cell stack, Korean Patent Laid-Open Publication No. 2014-0024776 and Korean Patent Laid-Open Publication No. 2014-0086150 are filed by the applicant.

The above information disclosed in this section is merely for enhancement of understanding of the background of the invention and therefore it may contain information that does not form the prior art that is already known in this country to a person of ordinary skill in the art.

SUMMARY

The present invention provides a fuel cell stack that may reduce a temperature deviation between cells through a simplified structure and improve a heat distribution and temperature uniformity of unit cells.

An exemplary embodiment of the present invention provides a fuel cell stack, that may include: unit cells in which that manifolds are provided; an end structural body that includes a current collector and an end plate, and that may be disposed at each of outermost sides of the unit cells; and a heat transfer member disposed between the end structural body and the outermost side of the unit cell and that contacts the outermost side of the unit cell in a planar direction.

The fuel cell stack may further include a medium plate interposed between the current collector of the end structural body and the outermost side of the unit cell, wherein the heat transfer member may be flatly inserted into one surface of the medium plate. An insertion groove into which the heat transfer member is inserted may be formed in one surface of the medium plate, and the heat transfer member may be inserted into the insertion groove, and the heat transfer member and the medium plate may form the same surface.

A first side of the heat transfer member may be disposed in the manifold that corresponds to a high temperature part from which a reaction fluid and a coolant are discharged, and a second side thereof may be disposed in the manifold that corresponds to a low temperature part in which the reaction fluid and the coolant flow. The heat transfer member may include a main body having thermal conductivity; a wick formed on an inner wall surface of the heat transfer member along a length direction of the main body; and a refrigerant as an operational fluid, and wherein the refrigerant in a liquefied state may move along the wick, and the refrigerant in a gaseous state may move along a cavity formed by the wick.

The heat transfer member may be formed to include a heat pipe of a band shape having a predetermined width and length. In particular, the heat transfer member may include a heat-absorbing portion positioned at the high temperature part, and a heat-radiating portion that extends from the heat-absorbing portion to be positioned at the low temperature part. The heat-radiating portion may be disposed at a higher position than the heat-absorbing portion based on a height direction of the medium plate to receive less influence of gravity.

The heat transfer member formed to include the heat pipe of the band shape having the predetermined width and length may have a planar bending structure. Additionally, the heat transfer member may include a heat-absorbing portion positioned at the high temperature part, and a heat-radiating portion flatly planar-bent in the heat-absorbing portion to extend to the low temperature part and positioned at the low temperature part. The heat transfer member may be positioned between the manifold that corresponds to the high temperature part and the manifold that corresponds to the low temperature part.

Further, the heat-absorbing portion may be exposed in the manifold that corresponds to the high temperature part. The heat transfer member formed to include the heat pipe of the band shape having the predetermined width and length may have a vertical bending structure. The heat transfer member may include a heat-absorbing portion vertically-bent in a direction in which the reaction fluid and the coolant flow, and a heat-radiating portion positioned at the low temperature part. The heat-absorbing portion may be inserted into the manifold that corresponds to the high temperature part along a stacked direction of the unit cells.

Additionally, a pair of heat transfer members may be provided. The heat transfer member formed to include the heat pipe of the band shape may be flatly inserted into one surface of the current collector, and may contact the outermost side of the unit cell in a planar direction. An insertion groove into which the heat transfer member is inserted may be formed in one surface of the current collector. The heat transfer member formed to include the heat pipe of the band shape may be flatly inserted into one surface of the end plate, and may contact the current collector in a planar direction. An insertion groove into which the heat transfer member is inserted may be formed in one surface of the end plate.

According to the exemplary embodiment of the present invention, heat may be rapidly transferred from a high temperature part to a low temperature part through the planar type of heat transfer members at the opposite outermost sides of the unit cells by installing the planar type of heat transfer members at the opposite outermost sides of the unit cells of the fuel cell stack. For example, the heat of the high temperature part may be rapidly transferred to the heat-radiating portion of the low temperature part through the heat-absorbing portion of the heat pipe, and thus the temperature of the low temperature part may increase.

Since the temperature deviation between the cells caused according to the delayed temperature increase in the end cell of the unit cells may be reduced during the cold-starting or the cold-driving, the heat distribution and the temperature uniformity of the unit cells may be improved. Accordingly, the cell voltage drop due to the temperature deviation between the cells may be improved, the output limit of the fuel cell stack may be solved, and durability of the fuel cell stack may be substantially improved. Further, since the planar type of heat transfer member may be disposed at each of the opposite ends of the fuel cell stack, a structure of the fuel cell stack may be substantially simplified and manufacturing costs of the fuel cell stack may be substantially reduced, unlike a typical fuel cell stack to which a PTC heater or a thermoelectric element is applied.

BRIEF DESCRIPTION OF THE DRAWINGS

The drawings are intended to be used as references for describing the exemplary embodiments of the present invention, and the accompanying drawings should not be construed as limiting the technical spirit of the present invention.

DESCRIPTION OF SYMBOLS

Figure 1:
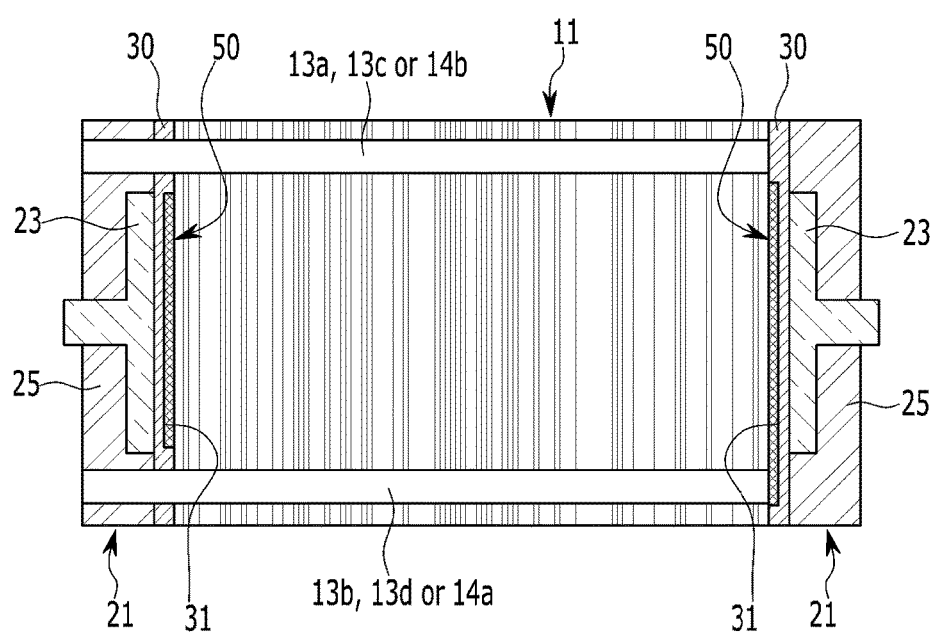
FIG. 1 illustrates a schematic diagram of a fuel cell stack according to an exemplary embodiment of the present invention.

11: unit cell
13a: manifold (hydrogen inlet)
13b: manifold (air outlet)
13c: manifold (air inlet)
13d: manifold (hydrogen outlet)
14a: manifold (coolant outlet)
14b: manifold (coolant inlet)
21: end structural body
23: current collector
24, 26, 31: insertion groove
25: end plate
30: medium plate
50: heat transfer member
51: heat pipe
53: main body
55: heat transfer path
57: wick
61: heat-absorbing portion
63: heat-radiating portion

DETAILED DESCRIPTION

Hereinafter, the present invention will be described more fully with reference to the accompanying drawings, in which exemplary embodiments of the invention are shown. As those skilled in the art would realize, the described exemplary embodiments may be modified in various different ways, all without departing from the spirit or scope of the present invention. Parts which are not related with the description are omitted for clearly describing the exemplary embodiment of the present invention, and like reference numerals refer to like or similar elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Since each component shown in the drawings is arbitrarily illustrated for easy description, the present is not particularly limited to the components illustrated in the drawings, and in order to clearly illustrate several parts and areas, enlarged thicknesses are shown. Further, in the following detailed description, names of constituents, which are in the same relationship, are divided into the first", the second", etc., but the present invention is not necessarily limited to the order in the following description.

Figure 2:
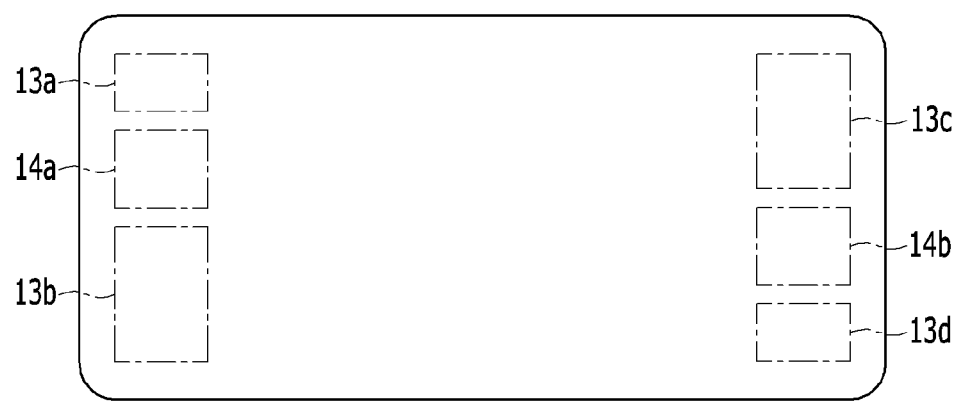
FIG. 2 illustrates a manifold structure of unit cells applied to a fuel cell stack according to an exemplary embodiment of the present invention.

FIG. 1 illustrates a schematic diagram of a fuel cell stack according to an exemplary embodiment of the present invention, and FIG. 2 illustrates a manifold structure of unit cells applied to a fuel cell stack according to an exemplary embodiment of the present invention. Referring to FIG. 1, a fuel cell stack 100 according to an exemplary embodiment of the present invention is an assembly of unit cells 11 which generate electrical energy through an electrochemical reaction of hydrogen as a fuel and air as an oxidant. Hereinafter, the hydrogen and the air supplied to the unit cells 11 for generating the electrical energy are respectively referred to as a "reaction fluid." Several tens to hundreds of the unit cells 11 may be stacked. Manifolds 13a, 13b, 13c, and 13d for supplying and discharging the reaction fluid and manifolds 14a and 14b in which a coolant flows may be disposed at the unit cells 11.

As shown in FIG. 2, a hydrogen inlet 13a, a coolant outlet 14a, and an air outlet 13b may be formed from the top toward the bottom of one side (e.g., a first side) of the unit cells 11 based on a height direction of the unit cells. An air inlet 13c, a coolant inlet 14b, and a hydrogen outlet 13d may be formed from the top toward the bottom of the other side (e.g., a second side) of the unit cells 11. An end structural body 21 may be respectively disposed at outermost sides (opposite ends) of the unit cells 11. Each end structural body 21 may include a current collector 23 and an end plate 25.

The current collector 23, configured to collect a current generated by the unit cells 11, may be disposed in close contact (e.g., abutting contact) with the unit cell 11 of the outermost side. The end plate 25 may be combined with the current collector 23, and while being fastened to each other by a fastening member, the end plate 25 and the current collector 23 are configured to press the unit cells 11 therebetween from the outermost (e.g., exert pressure onto the unit cells that are disposed between the end plate and the current collector). The end plate 25 disposed at an end (a first end, a left side of FIG. 1) of a first side of the unit cells 11 may be defined as an opened-type of end plate, and the end plate 25 disposed at an end (a second end, a right side of FIG. 1) of a second side of the unit cells 11 may be defined as a closed-type of end plate.

Manifold apertures connected to the manifolds (13a to 13d, 14a, and 14b) of the unit cells 11 may be formed in the opened-type of end plate, and the closed-type of end plate may omit manifold apertures to thus close the manifolds (13a to 13d, 14a, and 14b) of the unit cells 11. As described above, in the fuel cell stack 100, a relatively high temperature may be maintained at a manifold side (hereinafter, referred to as a "high temperature part") from which the reaction fluid and the coolant of the unit cells 11 may be discharged, and a relatively low temperature may be maintained at a manifold side (hereinafter, referred to as a "low temperature part") in which the reaction fluid and the coolant of the unit cells 11 flow.

In the fuel cell stack 100 during the cold-starting or the cold-driving, heat generated in the outermost side of the unit cells 11 may be absorbed by the end structural body 21 with a large heat capacity therearound, and a temperature deviation may occur between the end cells and intermediate cells based on a delay of a temperature increase of the end cells. Accordingly, an exemplary embodiment of the present invention provides the fuel cell stack 100 that may reduce a temperature deviation between the cells through a simplified structure and improve a heat distribution and temperature uniformity of the unit cells 11.

For this purpose, the fuel cell stack 100 according to the exemplary embodiment of the present invention may include a heat transfer member 50 configured to transfer heat of the high temperature part to the low temperature part and reduce a temperature deviation between the cells generated during the cold-starting or the cold-driving. In addition, the heat transfer member 50 may be disposed between the end structural body 21 and the unit cell 11 of the outermost side (hereinafter, referred to as the "end cell"), and may contact the end cell in a planar direction.

As described above, to dispose the heat transfer member 50 between the end structural body 21 and the end cell, the fuel cell stack 100 according to the exemplary embodiment of the present invention may include a medium plate 30 interposed between the end structural body 21 and the end cell. The medium plate 30 may have a shape that corresponds to the unit cell 11, may be disposed between the current collector 23 of the end structural body 21 and the end cell, and may be formed of a conductive metal plate. The end structural body 21 positioned at an end of one side of the unit cells 11 and a first medium plate 30 disposed between the end cells may include the manifold apertures connected to the manifolds (13a to 13d, 14a, and 14b) of the unit cells 11. The end structural body 21 positioned at an end of the other side of the unit cells 11 may omit any manifold apertures and a second medium plate 30 may be disposed between the end cells to close the manifolds (13a to 13d, 14a, and 14b) of the unit cells 11.

The heat transfer member 50 may be flatly inserted into one surface of the medium plate 30 that corresponds to the end cell. Accordingly, an insertion groove 31 into which the heat transfer member 50 may be flatly inserted may be formed in the one surface of the medium plate 30. For example, the heat transfer member 50 may be inserted into the insertion groove 31 of the medium plate 30, and may be formed to have the same surface as the one surface of the medium plate 30.

Figure 3A:
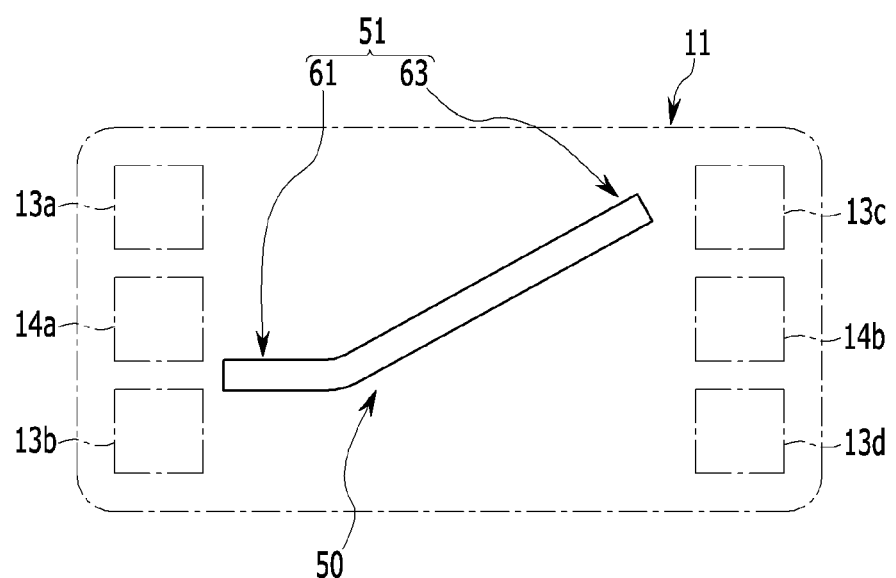
FIG. 3A to FIG. 8B respectively illustrate a structural diagram in which a heat transfer member applied to a fuel cell stack according to an exemplary embodiment of the present invention is disposed.
Figure 3B:
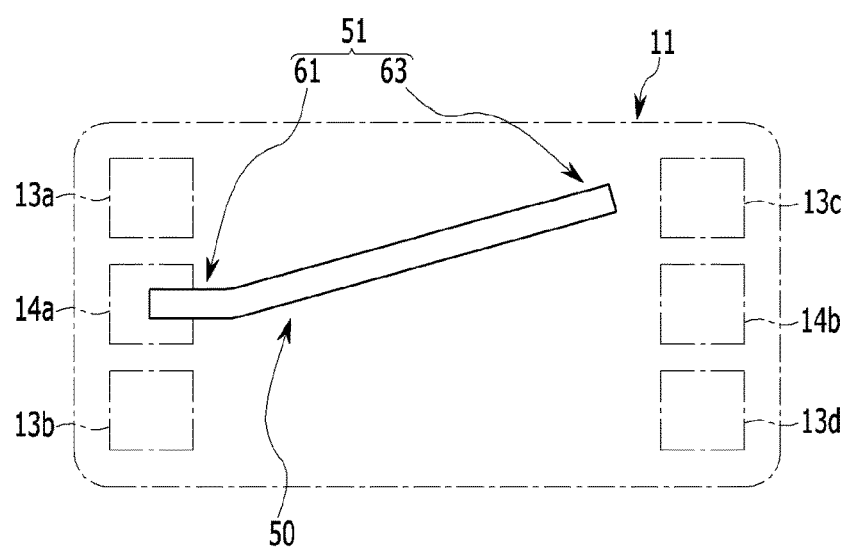

As shown in FIGS. 3A and 3B, a first side of the heat transfer member 50 may be disposed in the manifold (13b, 13d, or 14a) that corresponds to a high temperature part from which the reaction fluid and the coolant are discharged, and a second side thereof may be disposed in the manifold (13a, 13c, or 14b) that corresponds to a low temperature part in which the reaction fluid and the coolant flow. For example, the heat transfer member 50 may be configured to transfer the heat of the high temperature part of the end cell to the low temperature part.

Figure 4:
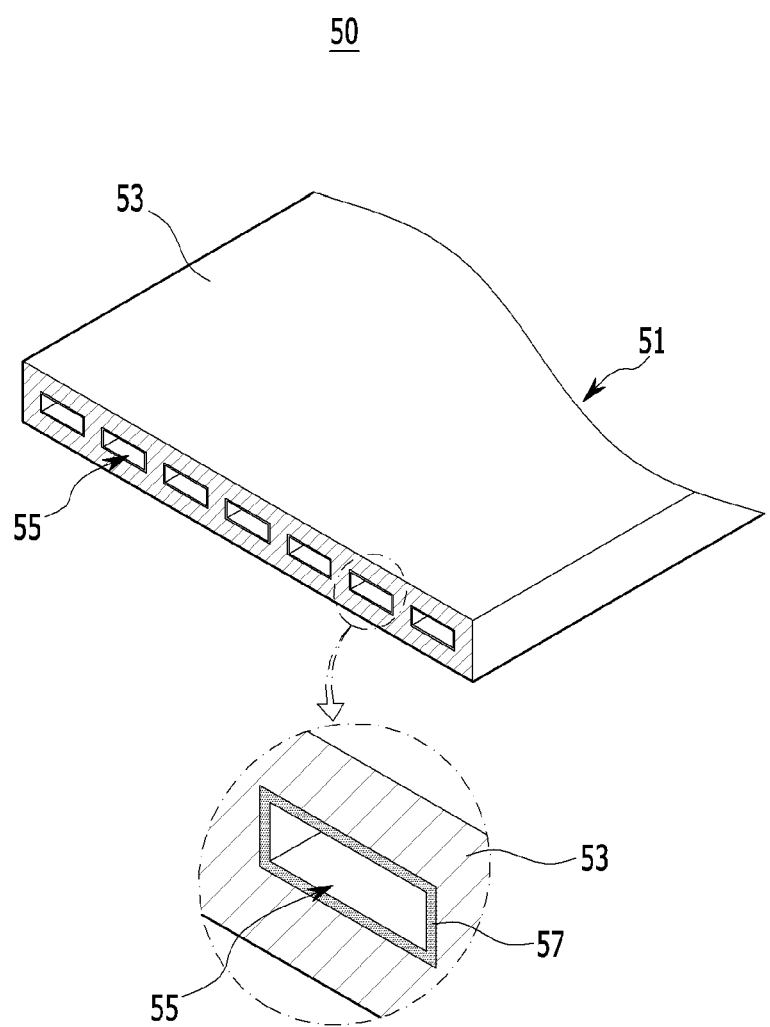

As shown in FIGS. 3A, 3B and 4, the heat transfer member 50 according to the exemplary embodiment of the present invention may include a heat pipe 51. The heat pipe 51 may be formed as a planar shape having a substantially thin thickness, and may be formed to have a band shape with a predetermined width and length. The heat pipe 51 may include a planar shape of a main body 53 having thermal conductivity, a wick 57 formed on an inner wall surface thereof along a length direction of the main body 53, and a refrigerant as an operational fluid. A cavity 55 may be formed inside the heat pipe 51 by the wick 57.

In particular, the heat pipe 51 may be configured to transfer heat form a point at which a heat generation density is high to a point at which the heat generation density is low (e.g., a reduce heat generation density), by using latent heat generated when a phase of the refrigerant is changed. The refrigerant in a liquefied state in the wick 57 may absorb heat at the high temperature part of the end cell to be evaporated, and the refrigerant in a gaseous state may move along the cavity 55 to the low temperature part thereof. At the low temperature part, the refrigerant in the gaseous state may be condensed while releasing heat and the condensed refrigerant may move along the wick 57 to the high temperature part.

The heat pipe 51 may include a heat-absorbing portion 61 positioned at the high temperature part, and a heat-radiating portion 63 that extends from the heat-absorbing portion 61 to be positioned at the low temperature part. The heat-radiating portion 63 may be disposed at a higher position than the heat-absorbing portion 61 based on a height direction of the medium plate 30 to receive less influence of gravity. The heat of the high temperature part may be absorbed by the heat-absorbing portion 61, and thus, the refrigerant may be evaporated, and the evaporated refrigerant may move to the heat-radiating portion 63, the refrigerant may release heat while being condensed in the heat-radiating portion 63, and the refrigerant condensed in the heat-radiating portion 63 may move again to the heat-absorbing portion 61.

According to the processes, the heat pipe 51 may be configured to transfer the heat of the high temperature part of the outermost side of the unit cells 11 to the low temperature part, to thus reduce the temperature deviation between the cells generated during the cold-starting or the cold-driving. More specifically, the heat pipe 51 according to the exemplary embodiment of the present invention, as shown in FIGS. 3A and 3B, may be formed to have a planar bending structure. Additionally, the heat pipe 51 may be planar-bent at the heat-absorbing portion 61 positioned at the high temperature part, and may extend to the low temperature part to position the heat-radiating portion 63 at the low temperature part.

As shown in FIG. 3A, the heat pipe 51 may be positioned between opposite manifolds (13a to 13d, 14a, and 14b) in the medium plate 30. The heat-absorbing portion 61 may be positioned at an air outlet 13b of the manifolds (13b, 13d, and 14a) that correspond to the high temperature parts, and the heat-radiating portion 63 may be positioned at an air inlet 13c of the manifolds (13a, 13c, and 14b) that correspond to the low temperature parts.

Alternatively, as shown in FIG. 3B, the heat-absorbing portion 61 may be positioned to be exposed in a coolant outlet 14a of the manifolds (13b, 13d, and 14a) that correspond to the high temperature parts, and the heat-radiating portion 63 may be positioned at the air inlet 13c. As the heat-absorbing portion 61 of the heat pipe 51 is positioned to be exposed in the manifold (13b, 13d, or 14a) that corresponds to the high temperature part, the heat may be more easily absorbed by the high temperature part.

Figure 5:
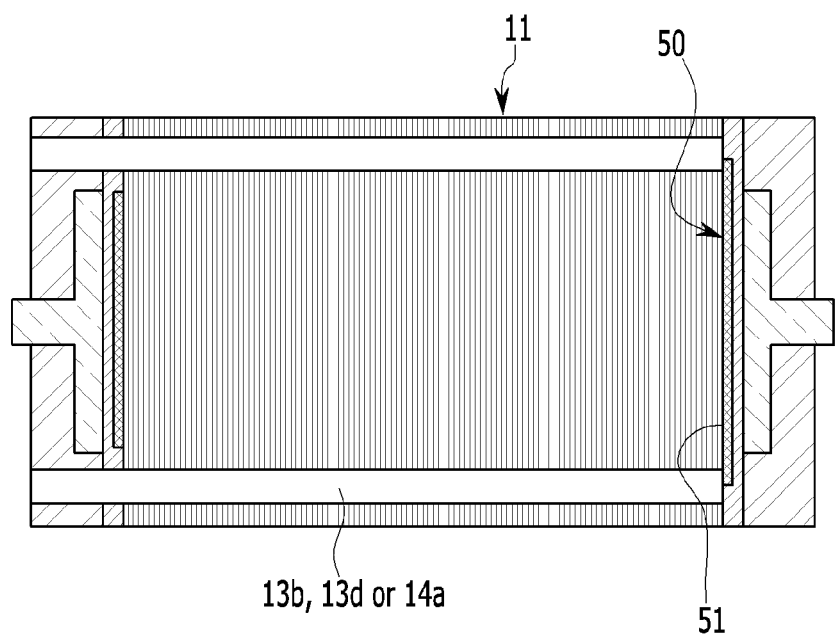
Figure 6A:
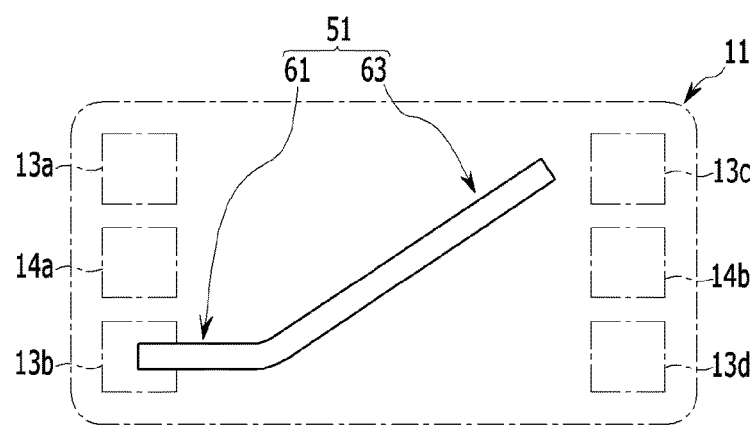

Furthermore, the heat-absorbing portion 61 of the heat pipe 51, as shown in FIG. 1, may be positioned to be exposed in the entire manifold (13b, 13d, or 14a) that corresponds to the high temperature part. The heat-absorbing portion 61 of the heat pipe 51, as shown in FIG. 5, may be positioned to be partially exposed in the manifold (13b, 13d, or 14a). In addition, the heat-absorbing portion 61 of the heat pipe 51, as shown in FIG. 6A, may be positioned to be exposed in the air outlet 13b of the manifolds (13b, 13d, and 14a) that correspond to the high temperature parts, and the heat-radiating portion 63 of the heat pipe 51 may be positioned at the air inlet 13c.

Figure 6B:
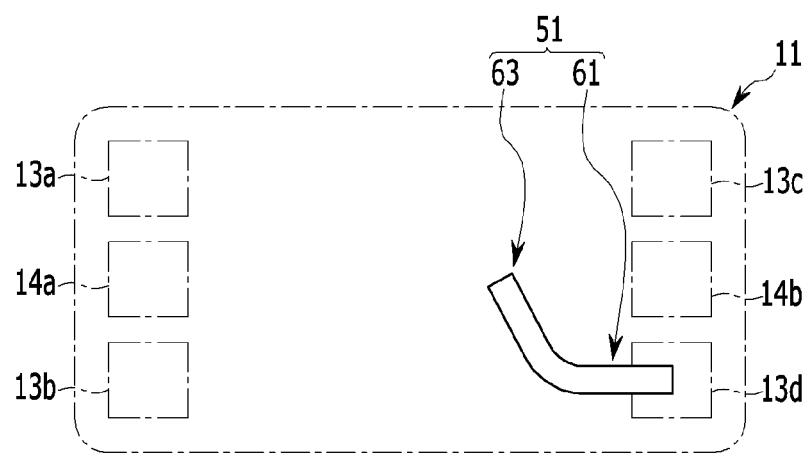
Figure 6C:
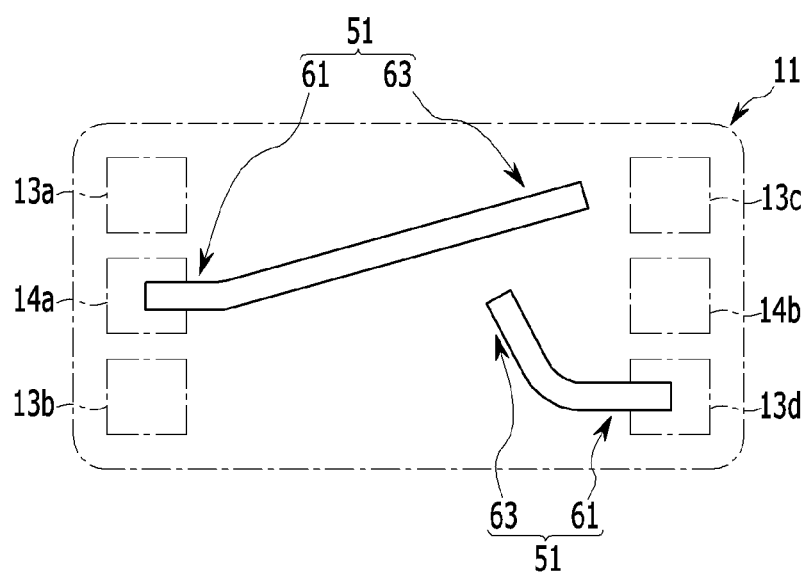

The heat-absorbing portion 61 of the heat pipe 51, as shown in FIG. 6B, may be positioned to be exposed in the hydrogen outlet 13d of the manifolds (13b, 13d, and 14a) that correspond to the high temperature parts, and the heat-radiating portion 63 of the heat pipe 51 may be positioned toward the hydrogen inlet 13a (or between the hydrogen inlet 13a and the air inlet 13c). Alternatively, as shown in FIG. 6C, a pair of heat pipes 51 according to an exemplary embodiment of the present invention may be provided at each end cell. The heat-absorbing portions 61 of the pair of heat pipes 51 may be positioned to be exposed in the coolant outlet 14a and the hydrogen outlet 13d of the manifolds (13b, 13d, and 14a) that correspond to the high temperature parts. The heat-radiating portions 63 of the pair of heat pipes 51 may be positioned toward the air inlet 13c and hydrogen inlet 13a.

Figure 7A:
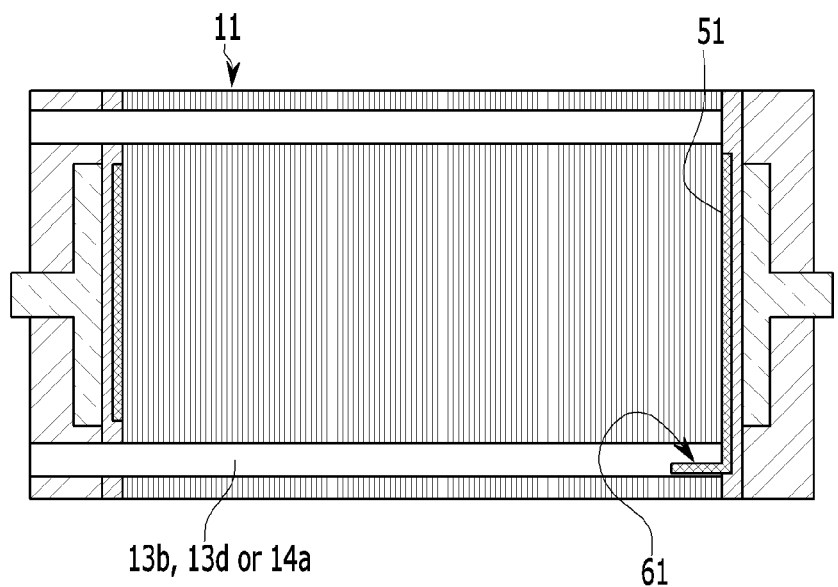
Figure 7B:
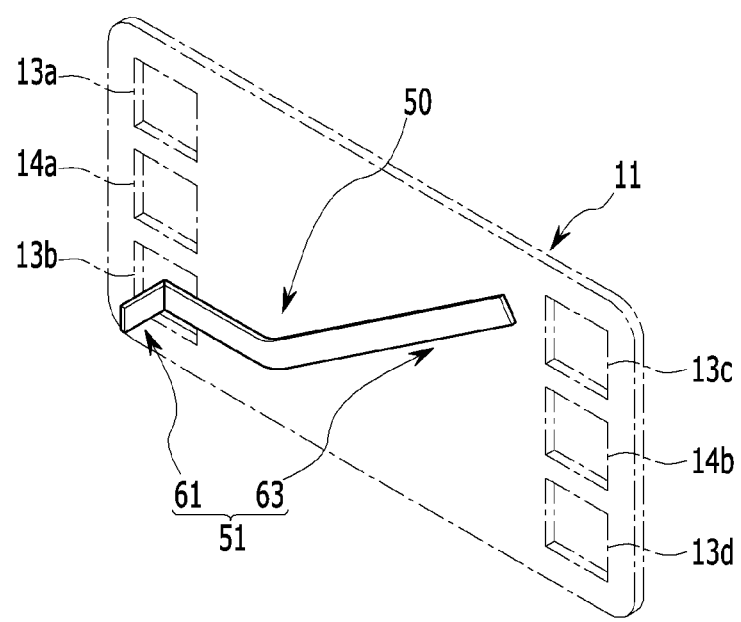

As shown in FIGS. 7A and 7B, the heat pipe 51 according to an exemplary embodiment of the present invention may be formed to have a vertical bending structure with a planar shape having a predetermined width and length. In the heat pipe 51, the heat-absorbing portion 61 positioned at the high temperature part may be vertically-bent in a direction (or a left direction of unit cells 11) in which the reaction fluid and the coolant flow, and the heat-radiating portion 63 may be positioned at the low temperature part.

The heat-absorbing portion 61 of the heat pipe 51 may be positioned to be inserted into the manifold (13b, 13d, or 14a) that corresponds to the high temperature part. For example, the heat-absorbing portion 61 of the heat pipe 51 may be positioned to be inserted along a direction in which the unit cells 11 are stacked on the air outlet 13b, and the heat-radiating portion 63 of the heat pipe 51 may be positioned at the air inlet 13c.

Figure 8A:
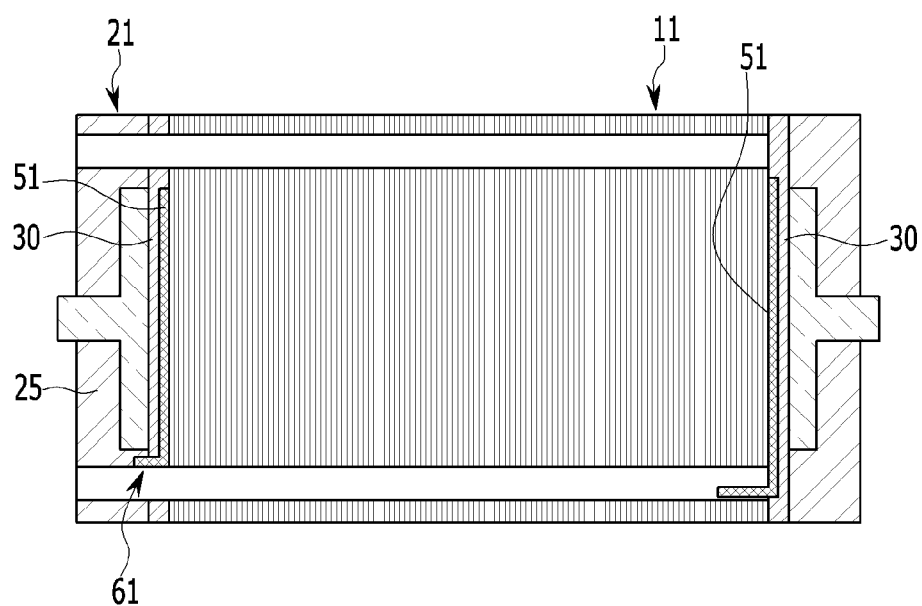

As the heat-absorbing portion 61 of the heat pipe 51 is inserted into the manifold (13b, 13d, or 14a) that corresponds to the high temperature part, the heat of the high temperature part may be absorbed more easily. Further, the heat pipe 51 may be flatly inserted (e.g., not at an angle) into the medium plate 30, and the heat-absorbing portion 61 of the heat pipe 51, as shown in FIG. 8A, may penetrate the medium plate 30 to be connected to the end plate 25 of the end structural body 21.

Figure 8B:
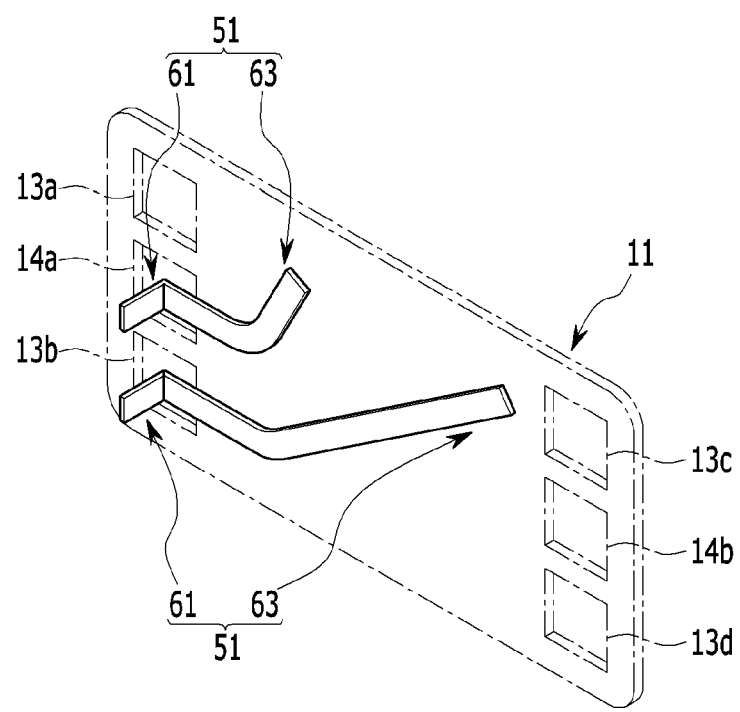

A pair of the vertical bending type of heat pipes 51, as shown in FIG. 8B, may be provided at each end cell. The heat-absorbing portions 61 of the pair of heat pipes 51 may be positioned to be inserted into the air outlet 13b and the coolant outlet 14a of the manifolds (13b, 13d, and 14a) that correspond to the high temperature parts along a stacked direction of the unit cells 11. The heat-radiating portions 63 of the pair of heat pipes 51 may be positioned toward the air inlet 13c (or, between the hydrogen inlet 13a and the air inlet 13c).

Figure 9A:
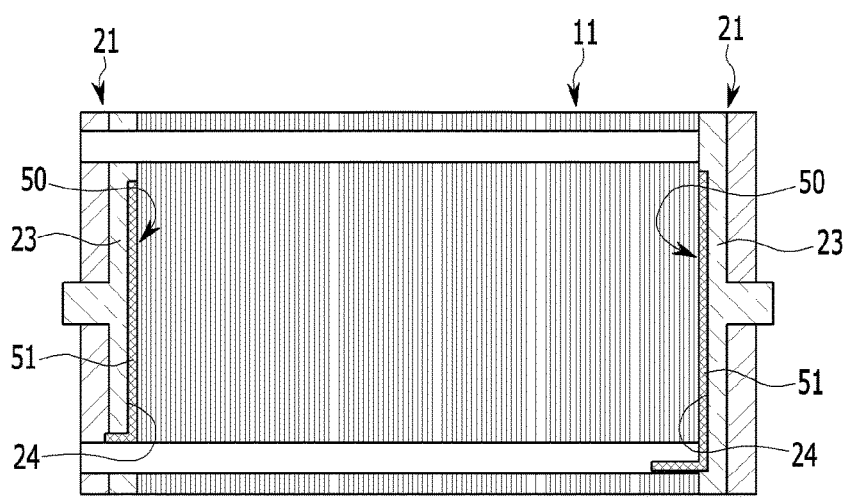
FIGS. 9A and 9B illustrate a structural diagram in which a heat transfer member applied to a fuel cell stack according to another exemplary embodiment of the present invention is disposed.
Figure 9B:
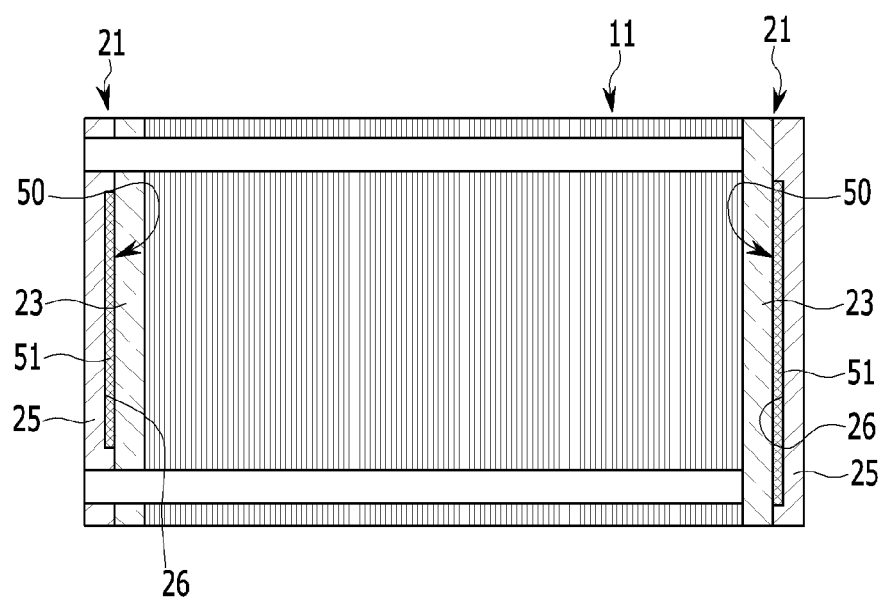

FIGS. 9A and 9B illustrate a structural diagram in which a heat transfer member applied to a fuel cell stack according to another exemplary embodiment of the present invention is disposed. Referring to FIGS. 9A and 9B, a structure of another exemplary embodiment of the present invention is similar to that of the exemplary embodiment described above, and may include at least one heat transfer member 50 that corresponds to the end cells of the unit cells 11 to be installed at the end structural bodies 21 in a planar direction.

The heat transfer member 50 may include a planar type of heat pipe 51, and the heat pipe 51, as shown in FIG. 9A, may be flatly inserted into one surface of the current collector 23 that corresponds to the end cell, and may be installed to contact the end cell in a planar direction. An insertion groove 24 into which the heat pipe 51 may be flatly inserted may be provided in one surface of the current collector 23. The heat pipe 51 may be flatly inserted into the insertion groove 24 of the current collector 23, and may be formed to have the same surface as one surface of the current collector 23.

The remaining structures except for the structures of the heat pipe 51 described above are the same as those of the exemplary embodiment described above, and thus a detailed description thereof will be omitted. The heat pipe 51 of the heat transfer member 50, as shown in FIG. 9B, may be flatly inserted into one surface of the end plate 25 that corresponds to the current collector 23, and may be installed to contact the current collector 23 in a planar direction. An insertion groove 26 into which the heat pipe 51 may be flatly inserted may be provided in one surface on the end plate 25. The heat pipe 51 may be flatly inserted into the insertion groove 26 of the end plate 25, and may be formed to have the same surface as one surface of the end plate 25.

As described above, according to the fuel cell stack 100 of the exemplary embodiments of the present invention, the heat may be rapidly transferred from the high temperature part to the low temperature part through the planar type of heat transfer members 50 at the opposite outermost sides of the unit cells 11 by installing the planar type of heat transfer members 50 at the opposite outermost sides of the unit cells 11 of the fuel cell stack 100. In other words, the heat of the high temperature part may be rapidly transferred to the heat-radiating portion 63 of the low temperature part through the heat-absorbing portion 61 of the heat pipe 51, thus the temperature of the low temperature part may increase.

Since the temperature deviation between the cells caused according to the delayed temperature increase in the end cell of the unit cells 11 may be reduced during the cold-starting or the cold-driving, the heat distribution and the temperature uniformity of the unit cells 11 may be improved. Accordingly, the cell voltage decrease due to the temperature deviation between the cells may be improved, the output limit of the fuel cell stack may be solved, and durability of the fuel cell stack may be substantially improved. Further, since the planar type of heat transfer member 50 may be provided at each of the opposite ends of the fuel cell stack, a structure of the fuel cell stack may be substantially simplified and manufacturing costs of the fuel cell stack may be substantially reduced, unlike a typical fuel cell stack to which a PTC heater or a thermoelectric element is applied.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A fuel cell stack, comprising:
   a plurality of unit cells in which manifolds are provided;
   an end structural body that includes a current collector and an end plate, and that is disposed at each of outermost sides of the unit cells;
   a heat transfer member that is disposed between the end structural body and the outermost side of the unit cell and contacts the outermost side of the unit cell in a planar direction; and
   a medium plate interposed between the current collector of the end structural body and the outermost side of the unit cell,
   wherein the heat transfer member is flatly inserted into one surface of the medium plate, and
   wherein an insertion groove into which the heat transfer member is inserted is formed in one surface of the medium plate, and the heat transfer member is inserted into the insertion groove, and the heat transfer member and the medium plate form the same surface.

2. The fuel cell stack of claim 1, wherein a first side of the heat transfer member is disposed in the manifold that corresponds to a high temperature part from which a reaction fluid and a coolant are discharged, and a second side of the heat transfer member is disposed in the manifold that corresponds to a low temperature part in which the reaction fluid and the coolant flow.

3. The fuel cell stack of claim 2, wherein the heat transfer member includes:
   a main body having thermal conductivity;
   a wick formed on an inner wall surface of the heat transfer member along a length direction of the main body; and
   a refrigerant as an operational fluid,
   wherein the refrigerant in a liquefied state moves along the wick, and the refrigerant in a gaseous state moves along a cavity formed by the wick.

4. The fuel cell stack of claim 2, wherein the heat transfer member includes a heat pipe having a belt shape and a predetermined width and length.

5. The fuel cell stack of claim 4, wherein the heat transfer member includes:
   a heat-absorbing portion positioned at the high temperature part, and
   a heat-radiating portion that extends from the heat-absorbing portion to be positioned at the low temperature part.

6. The fuel cell stack of claim 5, wherein the heat-radiating portion is disposed at a higher position than the heat-absorbing portion based on a height direction of the medium plate to receive less influence of gravity.

7. The fuel cell stack of claim 2, wherein the heat transfer member that includes the heat pipe of the belt shape with the predetermined width and length has a planar bending structure.

8. The fuel cell stack of claim 7, wherein the heat transfer member includes a heat-absorbing portion positioned at the high temperature part, and a heat-radiating portion that is flatly planar-bent in the heat-absorbing portion to extend to the low temperature part and is positioned at the low temperature part.

9. The fuel cell stack of claim 8, wherein the heat transfer member is positioned between the manifold that corresponds to the high temperature part and the manifold that corresponds to the low temperature part.

10. The fuel cell stack of claim 8, wherein the heat-absorbing portion is exposed in the manifold that corresponds to the high temperature part.

11. The fuel cell stack of claim 2, wherein the heat transfer member that includes the heat pipe of the belt shape having the predetermined width and length has a vertical bending structure.

12. The fuel cell stack of claim 11, wherein the heat transfer member includes a heat-absorbing portion vertically-bent in a direction in which the reaction fluid and the coolant flow, and a heat-radiating portion positioned at the low temperature part.

13. The fuel cell stack of claim 12, wherein the heat-absorbing portion is inserted into the manifold that corresponds to the high temperature part along a stacked direction of the unit cells.

14. The fuel cell stack of claim 1, wherein a pair of the heat transfer members are provided.

15. The fuel cell stack of claim 1, wherein the heat transfer member that includes the heat pipe of the belt shape having the predetermined width and length is flatly inserted into one surface of the current collector, and contacts the outermost side of the unit cell in a planar direction.

16. The fuel cell stack of claim 15, wherein an insertion groove into which the heat transfer member is inserted is formed in one surface of the current collector.

17. The fuel cell stack of claim 1, wherein the heat transfer member that includes the heat pipe of the belt shape having the predetermined width and length is flatly inserted into one surface of the end plate, and contacts the current collector in a planar direction.

18. The fuel cell stack of claim 17, wherein an insertion groove into which the heat transfer member is inserted is formed in one surface of the end plate.

\* \* \* \* \*